Patented Aug. 5, 1941

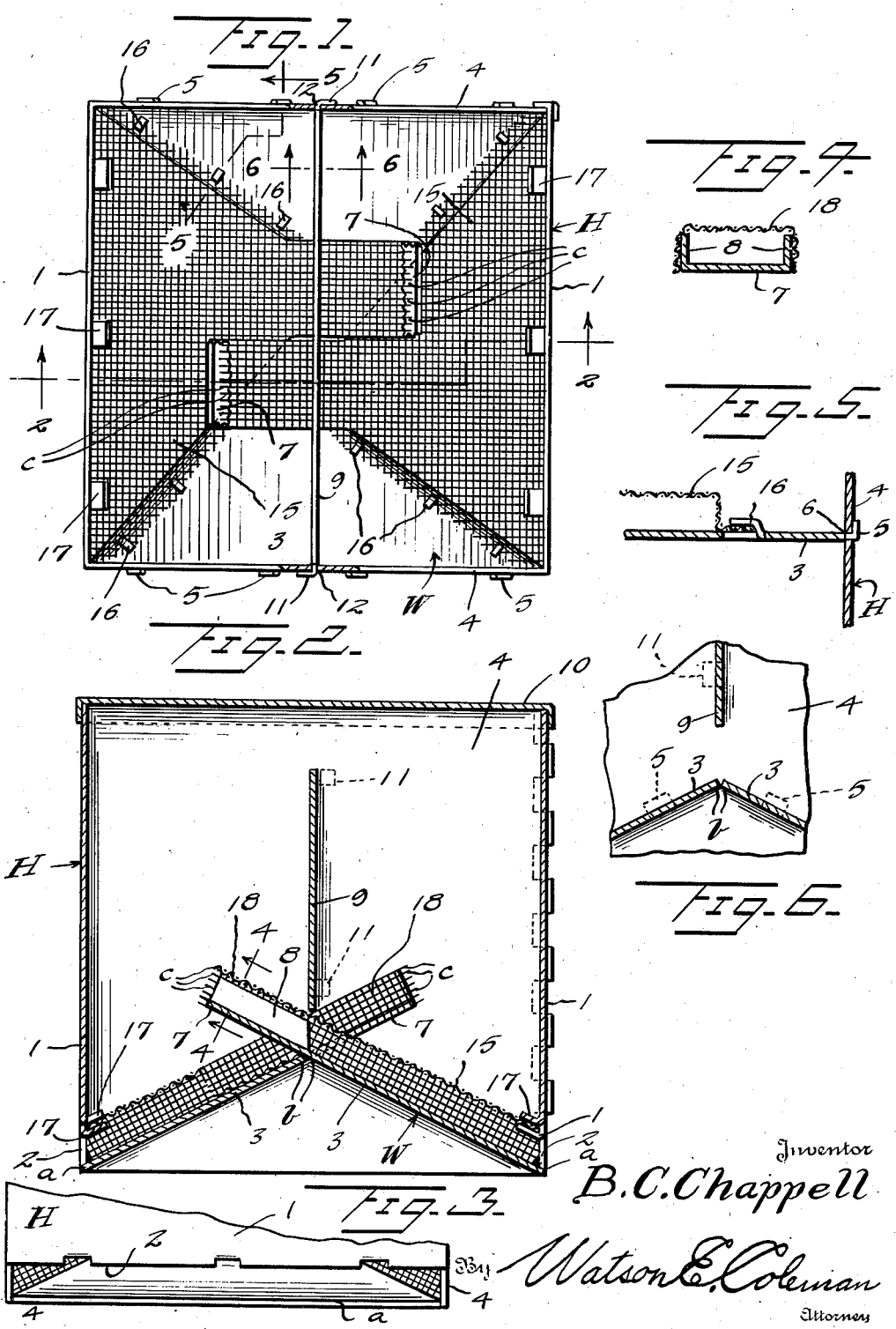

2,251,260

UNITED STATES PATENT OFFICE 2,251,260

INSECT TRAP

Bert C. Chappell, Kansas City, Mo.

Application October 26, 1940, Serial No. 363,051

6 Claims. (Cl. 43—121)

This invention relates to an insect trap and has relation more particularly to a device of this kind of a crawling-insect type, and it is an object of the invention to provide a trap of this kind comprising an enclosed chamber provided with inlet portions to allow insects to have ready ingress within the enclosed chamber, together with means whereby the captured insects are prevented from having egress through said inlet portions.

It is also an object of the invention to provide a trap of this kind to capture water bugs, roaches and other crawling insects including an enclosed chamber having opposed entrance slots in the side walls thereof, together with means within the chamber for dividing the same into two captive compartments and wherein the insects entering within the chamber through one of the slots is guided for capture within the chamber remote from such entrance opening.

Another object of the invention is to provide a trap of this kind including an enclosed chamber wherein the bottom wall or floor thereof is upwardly and inwardly inclined to facilitate the capture of the crawling insects which have a natural tendency to travel upwardly.

The invention consists in the details of construction and in the combination and arrangement of the several parts of my improved insect trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in top plan of a trap constructed in accordance with an embodiment of my invention, the lid or cover being omitted;

Figure 2 is a vertical sectional view taken substantially on the line 2—2 of Figure 1 with the lid or cover applied;

Figure 3 is a fragmentary front elevation of the lower portion of an end wall of the trap as herein embodied;

Figure 4 is a detailed sectional view taken substantially on the line 4—4 of Figure 2;

Figure 5 is a fragmentary detailed sectional view taken substantially on the line 5—5 of Figure 1;

Figure 6 is a detailed sectional view taken substantially on the line 6—6 of Figure 1.

As disclosed in the accompanying drawing, H denotes a housing of preferred dimensions and configuration but which is preferably rectangular in cross section to allow the housing to be placed closely adjacent to a wall. This is of advantage in view of the fact that insects, such as water bugs, roaches and the like have a tendency to travel along the wall.

Opposed walls 1 of the housing H have their lower portions cut away to provide therealong the entrance slots 2. The bottom margin of each of these slots 2 is defined by an edge $a$ of the bottom wall or floor W for the housing H. This wall or floor W is V-shaped in cross section with its apex upwardly disposed. Sloping portions 3 of this bottom wall or floor W extend upwardly with respect to the walls 1 with the high point $b$ of such wall or floor W substantially midway of the ends of the walls 4. These walls 4 in the present embodiment of the invention are perpendicularly related to the walls 1 and may be referred to as the side walls while the walls 1 may be called the end walls.

The bottom wall or floor W, as herein disclosed, has its inclined portions 3 constituting separate plates. These plates may be held in applied position in any preferred manner. As herein disclosed, the ends of such plates 3 are provided with the outstanding bendable lugs 5 insertible through the suitably positioned openings 6 in the walls 4. Each of these plates 3 has its upper or inner marginal portion provided with an elongated narrow extension 7 constituting a runway and which has its side margins defined by upwardly disposed flanges 8. Each of these extensions or runways 7 is to one side of the longitudinal center of the plate 3 and so positioned that in the assembled bottom wall or floor W said extensions or runways 7 are immediately adjacent to each other but disposed in opposite directions. It is also to be noted that these extensions or runways 7 are each substantially coplanar with its plate 3.

Interposed and bridging the space between the walls 4 is a partition plate 9. This plate is arranged directly above the high point $b$ of the bottom wall or floor W and parallel to the end walls 1. This plate is spaced a distance, however, above the high point $b$ and also terminates below the top edges of the walls 4. This partition plate 9 serves to effectively brace the structure of the housing H and also divides the interior chamber of the housing into two captive compartments. It is important, however, that the upper margin of this plate 9 terminate below the upper edges of the walls 4 so that the desired bait may be hung thereon. This bait may be of any kind preferred, it only being necessary that it emanate sufficient aroma to intice or lure the insects.

While the top of the housing H is open it is normally closed by a removable cover 10 herein disclosed as of a slip type.

The partition plate 9 may be held in position in any manner preferred but, as herein disclosed, the ends of this plate are provided with pincher lugs 11 which are directed through the suitably positioned openings 12 in the walls 4.

Disposed over each of the portions or plates 3 of the bottom wall or floor W are the flattened side entrances 15 of screen fabric. The side marginal portions of each of the entrances 15 are held to its portion or plate 3 in any desired manner but, herein disclosed, as through the medium of the spurs 16 struck from the portion or plate 3. Each of the entrances 15 has its base or widest end open with said wide or open end of a length substantially coextensive in length with the slot 2 of the adjacent end wall 1. This base or larger end portion of the entrance 15 is soldered or otherwise secured in position and for which purpose the lower edge of the adjacent wall 1 defining the upper margin of the slot 2 is provided with the inwardly disposed flanges 17. The apex portion of the entrance 15 is provided with the extension 18 which overlies the extension or runway 7 of one of the portions or plates 3. This extension 18 does not, however, obstruct the exit at the outer or free end portion of the extension or runway 7.

In practice the housing H is preferably set on a floor or other supporting surface with a side wall 4 immediately adjacent to the wall of a room or other enclosure, thus permitting the slots 2 to be oppositely directed and thereby provide inlets for the insects crawling along the wall in opposite directions.

As the insects pass within the housing H through the slots 2 they will travel by natural tendency upwardly of the portions or plates 3 and pass out through the exits at the outer ends of the extensions or runways 7. It is to be noted that the extension 18 of each of the entrances 15 has certain of the wires thereof extended, as at c, to prevent the captive insect from passing back upon the extension or runway 7 through the exit at the outer end thereof.

From the foregoing description it is thought to be obvious that an insect trap constructed in accordance with my invention particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall.

2. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall, said extensions of the bottom wall being in close proximity one to the other.

3. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall, and a plate within the housing and extending thereacross, said plate being above the apex of the bottom wall.

4. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall, a plate within the housing and extending thereacross, said plate being above the apex of the bottom wall, the top of the housing being open, and a removable cover for said open top, the plate extending across the housing and having its upper edge terminating below the open top of the housing, said plate serving as a bracing means and also as a hanger for bait.

5. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall, said bottom wall comprising two plates, and the extensions hereinbefore referred to being carried by the plates and extending beyond the upper adjacent edges thereof.

6. A trap comprising a housing having inlet slots at the lower portions of opposed walls, a bottom wall for the housing in the form of an inverted V, said bottom wall at its apex being provided with oppositely and outwardly disposed extensions, flattened entrances of screen material mounted upon the bottom wall at opposite sides of the apex, each of said entrances having its larger end open with a slot in one of the walls in communication therewith, the upper or smaller end of each entrance being provided with an extension overlying the adjacent extension of the bottom wall, said bottom wall comprising two plates and the extensions hereinbefore referred to being carried by the plates and extending beyond the upper adjacent edges thereof, said extensions being coplanar with the plates.

BERT C. CHAPPELL.